March 4, 1930.  J. A. ISBELL  1,749,346

DRIVE FOR UNIT PRESSES AND FOLDERS

Filed March 16, 1926

Inventor
John A. Isbell
By Attorneys
Southgate Fay & Hanley

Witness
C. F. Mason

Patented Mar. 4, 1930

1,749,346

UNITED STATES PATENT OFFICE

JOHN A. ISBELL, OF PLAINFIELD, NEW JERSEY, ASSIGNOR TO WOOD NEWSPAPER MACHINERY CORPORATION, OF NEW YORK, N. Y., A CORPORATION OF VIRGINIA

DRIVE FOR UNIT PRESSES AND FOLDERS

Application filed March 16, 1926. Serial No. 95,036.

The principal object of this invention is to provide a drive for connecting the several units of a press with the main driving means in such a way that the several units can be disconnected from the drive individually so as not to interfere with the driving of the other units and in which this can be done in a convenient manner.

Other objects of the invention will appear hereinafter.

Reference is to be had to the accompanying drawings in which

Figure 1:
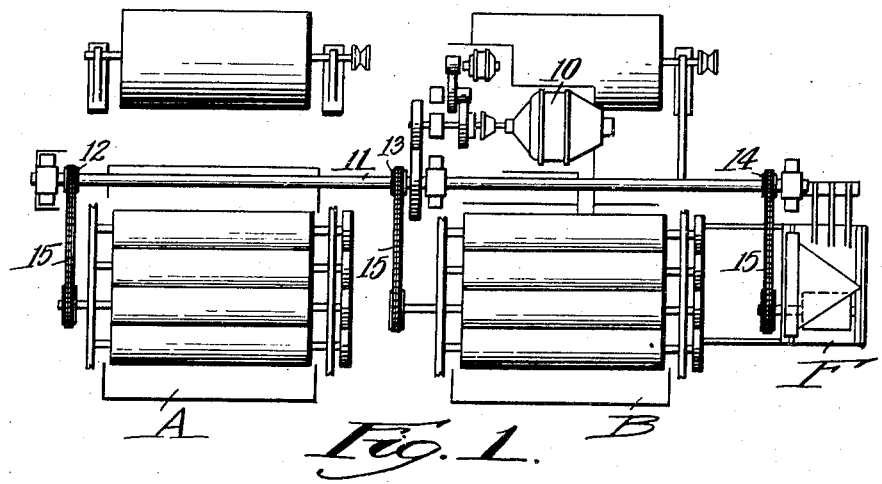
Fig. 1 is a plan of a certain type of multiple press showing the drive for the several units arranged in accordance with this invention.
Figure 2:
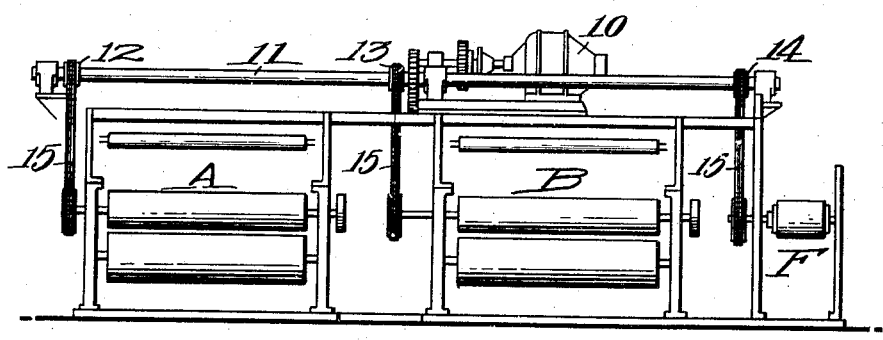
Fig. 2 is a side view thereof.
Figure 3:
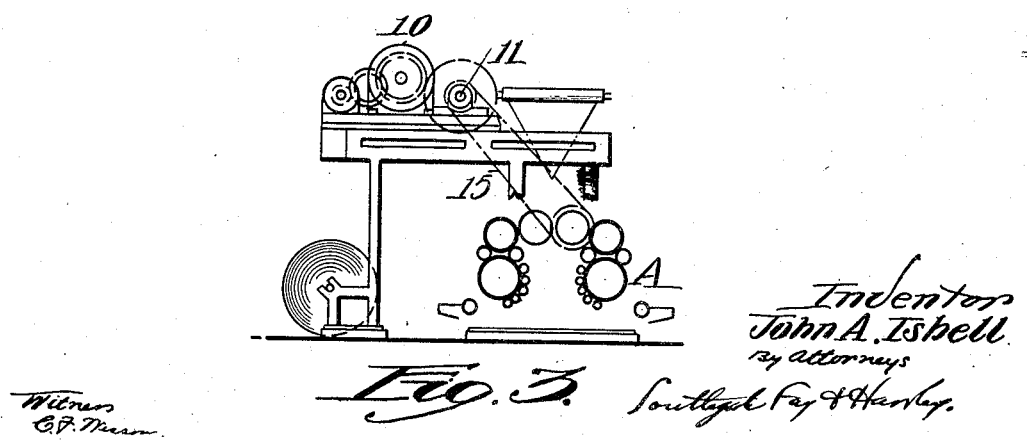
Fig. 3 is an end view of the same.

Heretofore one method employed for connecting up several units consisted of a direct connection between the ends of the shafts of the cylinders in each unit, generally constructed with projections on the shafts which engaged each other to drive the several units together. In that case the disability of one of the intermediate units breaks the power transmissions to any unit, which may be driven from it on either side thereof, and throws out the whole mechanism until the necessary repairs are made.

This invention is designed for the purpose of obviating this difficulty.

In the form shown on the first sheet of drawings, the two press units A and B are set up end to end, that is, with the corresponding cylinders in line with each other longitudinally. Of course, the invention is not limited to the employment of two units only. Furthermore the folder F is located at the end of the series.

In this case I drive the entire printing machine from a motor 10 which is geared, in any desirable way, to a main driving shaft 11 which is located above the press and extends along the same from one end to the other parallel to the axes of the printing cylinders.

For driving each unit I provide sprockets 12, 13 and 14 on the driving shaft 11 and drive the driving shaft of each unit from these sprockets by means of sprocket chains 15. In this way the driving shafts of the units A, B and F are driven from the driving shaft 11 at whatever speed may be desired. Ordinarily, of course, these driving shafts are all driven at the same speed. By this means any intermediate unit may be silenced by disconnecting the sprocket chain 15 from the sprocket wheels, without in any way interfering with the operation of the driving or folding units on either side of it.

It is to be understood that although I have shown only two printing units, the invention is not limited to any particular number, nor in fact to the particular location of the folding device or devices. This arrangement secures all the objects mentioned above, without in any way decreasing the output of the press or limiting the operation of its several units.

Although I have illustrated and described only one form of the invention I am aware of the fact that modifications can be made in the way of connecting the parts which have been described with the units of the press and with the motor.

Therefore I do not wish to be limited in this respect but what I do claim is:

1. In a printing machine, the combination with a plurality of printing units arranged end to end in alignment and a folding unit arranged at the end of the series, of a longitudinal main shaft, means for driving the main shaft, a series of driving wheels on the main shaft, a drive shaft for each of the several units, and means whereby each of the driving shafts of the several units and the folder can be driven from certain of said driving wheels, each of the last named means being individually capable of being disconnected.

2. In a printing machine, the combination with a plurality of printing units arranged adjacent to each other and a folding unit arranged at the end of the series, of a main shaft located longitudinally of the series over the printing units, means for driving the main shaft, a drive shaft for each of the several units, and means for driving each of the driving shafts of the several units directly from the main shaft.

3. In a printing machine, the combination with a plurality of printing units arranged end to end in alignment and a folding unit arranged at the end of the series, of a longitudinal main shaft located over the printing units, means for driving the main shaft, a drive shaft for each of the several units, and means whereby the driving shafts of the several units can be driven directly from the main shraft, each of the last named means being individually capable of being disconnected.

In testimony whereof I have hereunto affixed my signature.

JOHN A. ISBELL.